Aug. 25, 1942. W. O. WELLS ET AL. Re. 22,167

FABRIC DRESS GLOVE

Original Filed Feb. 8, 1939

Inventors
W. O. Wells,
C. K. Waite,

By Edmund H. Parry Jr.
Attorney

Reissued Aug. 25, 1942 Re. 22,167

UNITED STATES PATENT OFFICE 22,167

FABRIC DRESS GLOVE

William O. Wells, Evanston, Ill., and Carlton K. Waite, Louisiana, Mo., assignors to Wells Lamont Smith Corp., Chicago, Ill., a corporation of Minnesota Original No. 2,167,226, dated July 25, 1939, Serial No. 255,342, February 8, 1939. Application for reissue January 13, 1941, Serial No. 374,374

13 Claims. (Cl. 2—159)

Figure 1:
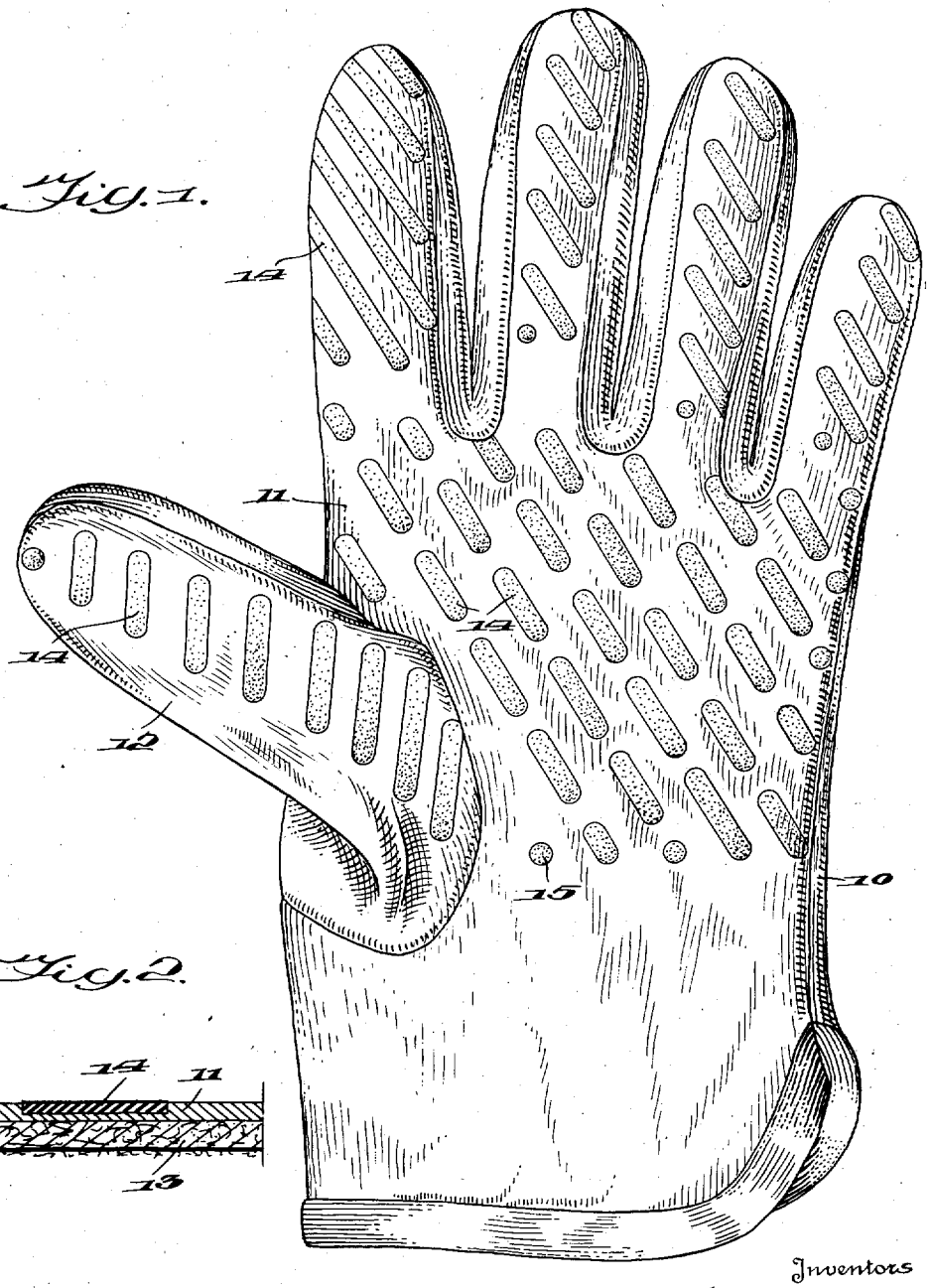

This invention relates to fabric gloves and the tendency thereof to slip when an object is grasped, and is of such character as to be of particular utility in connection with fabric dress gloves for everyday wear which are styled to provide a close fit on the hand and present a neat, attractive appearance. Fabric gloves of this type are usually made of Jersey cloth or similar knitted fabric of relatively fine texture. Because of their relatively low cost these gloves are coming into use in place of dress leather gloves which are considerably more expensive. It has been found, however, that fabric dress gloves have a serious drawback which considerably limits their adoption and use in that due to inherent characteristics of the fabric they slip on smooth surfaces and it is almost impossible to firmly grasp objects with the hands when the gloves are worn.

The essential object of the present invention is to overcome the objection just referred to. Since the gloves are of a dressy type, and appearance is an extremely important factor, various gripping arrangements heretofore proposed for work gloves are entirely unsuitable, and any arrangement which would detract from the appearance, no matter how successfully it performed its gripping function, would render the glove unsalable. It is therefore a further important object of the invention to increase the gripping ability of a fabric dress glove by means which while not completely invisible are of such character as to be substantially unnoticeable and otherwise unobjectionable, and which also are extremely durable and efficiently perform their intended function.

According to the invention the front sides of the fabric glove fingers and at least a portion of the palm will be provided with a mutliplicity of gripping elements which are embedded in the fabric, and which are so formed as to project no more slightly, if at all, above the fabric surface. For purposes of appearance the total actual gripping surface in the desired areas presented by the multiple of elements is restricted, but the elements are so formed and distributed as to give the entire areas adequate gripping power and at the same time leave exposed substantial portions of the fabric surface. By controlling the size of the elements and their spacing, it is possible to obtain an arrangement which will function efficiently but which at the same time will be relatively unnoticeable. The elements, aside from their size, should not contrast with the surface of the glove any more than can be helped. To this end the elements should be of a color substantially the same as the fabric of the glove, and it is found that the elements can be so formed as to have an apparent texture simulating the knitted texture of the surrounding fabric.

The invention will be understood by reference to the accompanying drawing showing one embodiment thereof in connection with the accompanying detailed decription.

Figure 2:
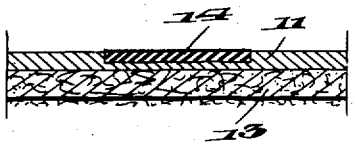

In the drawing:

Fig. 1 is an elevational view of the front side of a fabric dress glove and illustrating the invention; and Fig. 2 is a fragmentary cross-section, greatly magnified and substantially diagrammatic, of the glove fabric and lining, and illustrating the character of the gripping elements.

The glove illustrated in Figure 1 is of the dress type, patterned to closely fit the hand. It has been found that the best fit and appearance can be obtained by employing Jersey cloth or similar knitted fabric because of the ability of such materials to conform to the shape of the fingers and hand proper more closely than woven fabric. The glove comprises a knitted back section 10, and a knitted front section 11 forming the palm and front sides of the fingers. The thumb 12 will be formed of similar material. A fleecy lining material 13, shown in Figure 2, will preferably be employed as a lining, the same being suitably anchored to the front and back knitted sections just referred to which form the outside of the glove.

The gripping means comprises a series of relatively small elements 14 of rubber composition embedded in the fabric of the front section 11. Such elements are arranged in substantially spaced relation so as to leave exposed between them areas of fabric of greater proportions than the area collectively defined by the rubber grip elements so that the areas of the glove in which the elements are located will present a predominant fabric surface and thereby minimize the noticeability of the elements which, as indicated, will be sufficiently small as not to detract from the appearance of the glove.

The grip elements 14 in Figure 1 are of narrow and elongated form, although in some instances circular elements 15 may be employed. The various elements are arranged in a series of spaced parallel lines in the palm area, and are similarly disposed in the present case in the front areas of each of the fingers and the thumb. It will be observed that the spacing between the various lines of elements is somewhat greater than the width of the elements so that the area occupied by the elements is minimized as far as possible without diminishing the frequency of the elements to the point where inadequate gripping power will be obtained.

It will be observed in the illustrated embodiment of the invention that the elongated elements are arranged along lines which extend diagonally of the front section 11 and inner portion of the thumb 12. Such arrangement is not merely arbitrary. The diagonal arrangement enables the greatest area of each of the elements and the greatest number of elements to contact an object when the same is grasped, and the arrangement is such that despite the restricted size and the spacing of the elements a gripping action is obtained which from the practical standpoint is as satisfactory as in a glove where the whole area of the fabric surface is treated with rubber. It will be observed that in the case of the index finger, the rubber elements are extended well around the outer side thereof because such finger is usually dependent upon to a considerable extent in grasping any sort of object.

The rubber elements are preferably applied to the fabric in the piece before the glove is formed because it can be done with greater facility at that time. A self-drying rubber or latex composition in a volatile solvent is employed which is thinned sufficiently that the composition will readily penetrate into the knitted texture of the fabric. Ordinarily a stencil will be employed cut with the desired form and arrangement of elements. This will be laid over the fabric and the composition will be applied through the openings therein. Substantial pressure will be employed to insure the penetration of the composition into the fabric, and so as to enable the exposed surface of the elements to be made substantially flush with the surface of the surrounding fabric. In practice it is found that the surface of the elements will project no more than approximately 1/64 of an inch above the adjoining fabric surface.

The disposition of the elements 14 in the fabric of the front glove section 11 is diagrammatically illustrated in Figure 2. The rubber composition will be supplied in sufficiently small quantity as not to penetrate into the lining 13, and in most instances other than where the fabric is extremely thin the rubber will not penetrate completely through the fabric of section 11. The avoidance of any appreciable thickness of rubber film at the outer surface of the fabric minimizes the noticeability of the elements 14. It is further found that the texture of the fabric, by reason of the pressure employed in applying the rubber composition, marks itself at the surface of the elements to some degree, thereby minimizing contrast with the adjoining exposed fabric surface. The use of pigment in the rubber composition conforming to the color of the glove will therefore enable the elements to be employed without seriously detracting from the appearance of the glove and the requisite dressy effect of the glove is maintained while at the same time overcoming the tendency of the glove to slip on objects which are grasped.

The provision of a grip area according to the invention is the front palm and finger portions of a fabric glove embodying scattered small elements of rubber composition separated from each other by intervening exposed areas of the fabric may advantageously be employed in lieu of a large grip area formed by coating the entire area with rubber or applying thereto rubber strips of considerable dimensions as sometimes employed with fabric work gloves. Both of the latter arrangements are objectionable for both work and dress fabric gloves in the respect, among others, that the gloves are rendered undesirably stiff.

The invention is capable of a certain degree of modification and equivalency and the scope thereof is to be determined according to the scope of the appended claims.

We claim:

1. A dress glove of textile fabric including a back section and a front palm and finger section, said front section having a grip area at its outer face adapted to overcome the tendency of the glove to slip on objects grasped but preserving the appearance and usefulness of the glove for dress wear, said grip area including a multiplicity of small individual rubber grip elements of substantially the same color as the glove fabric and arranged in spaced relation to each other with exposed surface portions of the glove fabric lying between them, said elements being embedded in the front section with their outer surfaces substantially flush with the surrounding exposed fabric surface portions, the grip elements being so small and so widely spaced from each other that their total outer surface area is less than the exposed surface area of the intervening portions of fabric.

2. A dress glove of textile fabric including a back section and a front palm and finger section, said front section having a grip area at its outer face adapted to overcome the tendency of the glove to slip on objects grasped but preserving the appearance and usefulness of the glove for dress wear, said grip area being composed in part of exposed fabric surface portions and embodying a multiplicity of small embedded grip elements of rubber composition spaced from each other by intervening exposed fabric surface portions and presenting outer gripping surfaces which collectively constitute a lesser part of the grip area than the exposed fabric surface portions.

3. A textile fabric dress glove including a back section and a front palm and finger section, both including an outer layer of knitted fabric and an inner layer of lining material, said front section having a grip area at its outer face adapted to overcome the tendency of the glove to slip on objects grasped but preserving the appearance and usefulness of the glove for dress wear, said grip area being composed predominantly of exposed surface portions of the knitted fabric outer layer and embodying a multiplicity of small, spaced elements of rubber composition embedded in said layer and so shaped and arranged as to be relatively unoticeable.

4. A dress glove of textile fabric including a back section, and front palm and finger portions, said front palm and finger portions each having embedded therein at recurrent spaced points small elements of rubber composition separated from each other at the outer face of said portions by substantial areas of exposed fabric surface, the exposed fabric surface areas constituting the predominant part of the grip area.

5. A dress glove of textile fabric including a back section and a front palm and finger section, said front section having a grip area at its outer face adapted to overcome the tendency of the glove to slip on objects grasped but preserving the appearance and usefulness of the glove for dress wear, said grip area embodying a plurality of narrow parallel spaced strips of rubber composition embedded in the front section and separated from one another by intervening exposed fabric outer surface portions of said section.

6. A dress glove of textile fabric including a back section and a front palm and finger section, said front section having a grip area at its outer face adapted to overcome the tendency of the glove to slip on objects grasped but preserving the appearance and usefulness of the glove for dress wear, said grip area embodying a plurality of spaced parallel lines of small and narrow grip elements of rubber composition, said elements being embedded in the front section and being surrounded by intervening exposed fabric outer surface portions of said section.

7. A dress glove of textile fabric including a back section and a front palm and finger section, said front section having a grip area at its outer face adapted to overcome the tendency of the glove to slip on objects grasped but preserving the appearance and usefulness of the glove for dress wear, said grip area embodying a plurality of narrow lines of embedded rubber grip elements extending diagonally across the front section and being separated by exposed fabric outer surface portions of said section.

8. A dress glove of textile fabric including a back section and a front palm and finger section, said front section having a grip area at its outer face adapted to overcome the tendency of the glove to slip on objects grasped but preserving the appearance and usefulness of the glove for dress wear, said grip area comprising a plurality of narrow lines of rubber composition extending diagonally across the palm portion in spaced parallel relation and spaced from each other by exposed portions of the fabric outer surface, and similarly directed spaced narrow lines of rubber composition extending diagonally across the front finger portions.

9. A dress glove of textile fabric including a back section and a front palm and finger section, said front section having a grip area at its outer face adapted to overcome the tendency of the glove to slip on objects grasped but preserving the appearance and usefulness of the glove for dress wear, said grip area embodying small narrow grip elements of the same color as the fabric and composed of self-drying rubber composition, said elements forming a series of spaced parallel lines across the front section and being embedded in said section with their grip surfaces surrounded by, and substantially flush with, exposed fabric outer surface portions of the front section.

10. A glove including a textile fabric palm portion, and textile fabric front finger and thumb portions, each said portion having a composite outer face adapted to overcome the tendency of the fabric to slip on objects grasped embodying small individual elements of rubber composition anchored in the fabric and surrounded by exposed surface areas of the fabric of greater dimensions than the dimensions of said elements.

11. A glove including front palm and finger and thumb portions of textile fabric, the palm portion presenting a composite grip area comprising small elements of rubber composition embedded in the palm fabric at recurrent points and separated from each other by substantial exposed areas of the palm fabric surface, and the finger and thumb portions also presenting a grip area comprising small elements of rubber composition embedded in the finger fabric at recurrent points and separated from each other by substantial exposed areas of the finger fabric surface, the exposed fabric areas in both the palm and finger and thumb grip areas constituting the predominant part of the grip areas.

12. A glove including a front palm and front finger section of textile fabric having a composite grip area at its outer face adapted to overcome the tendency of the glove to slip on objects grasped, said grip area embodying spaced lines of spaced small elements of rubber composition embedded in the fabric of the palm and finger portions, the elements in each line being separated from adjacent elements of the same and other lines by intervening exposed substantial areas of the fabric of said portions.

13. A textile fabric glove including a back section, and front palm finger and thumb portions, having a composite front grip surface adapted to overcome the tendency of the glove to slip on objects grasped comprising spaced parallel narrow lines of small elements of rubber composition in the front palm finger and thumb portions separated from each other by substantial exposed areas of the fabric.

WILLIAM O. WELLS.
CARLTON K. WAITE.